Figure 1:
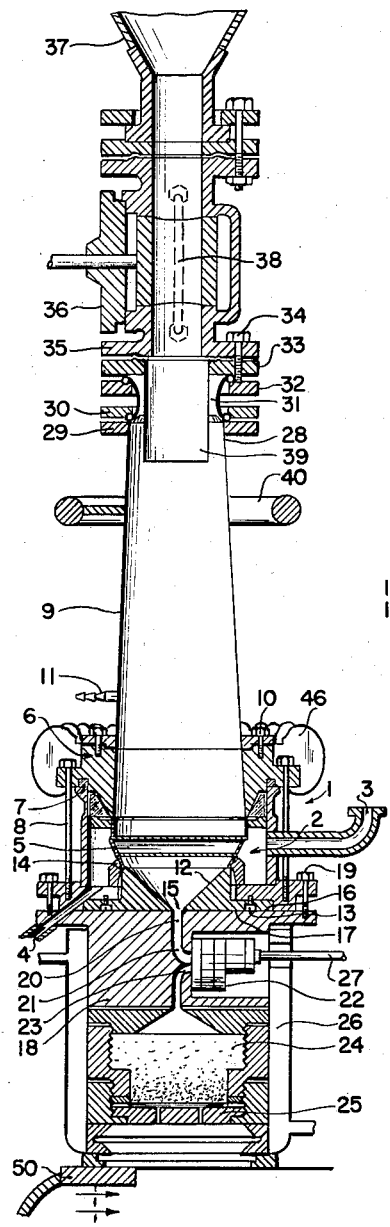

June 26, 1962   J. W. I. HEIJNIS   3,041,048
MELTING GRID
Filed March 7, 1960

INVENTOR.
J.W.I. HEIJNIS
BY Francis W. Young
ATTORNEY ered June 26, 1962

United States Patent Office 3,041,048
Patented June 26, 1962

3,041,048
MELTING GRID
James Watt Ijsbrand Heijnis, Arnhem, Netherlands, assignor to American Enka Corporation, Enka, N.C., a corporation of North Carolina
Filed Mar. 7, 1960, Ser. No. 13,340
Claims priority, application Netherlands Apr. 6, 1959
1 Claim. (Cl. 257—304)

This invention relates generally to an apparatus for the manufacture of thread-like or ribbon-like products from thermoplastic linear polymers such as polyamides, polyesters, or polyurethanes, and more particularly to an improved system for the grid spinning of such polymers under precise temperature controlled conditions.

In this system, polymer in the form of granules, chips or shavings, is conveyed from a container through a down pipe onto a melting grid comprising one or more heated grid bars and a heated grid wall, and subsequently is pressed in molten condition from a storage chamber adjoining the grid bars through one or more spinning or molding orifices by means of pumps, after which the formed products are cooled and collected. The grid inner wall adjoins the inner wall of the down pipe and forms a continuous surface.

In carrying out a known method similar to the type to be described more fully hereinbelow, the melting grid is heated to above the melting point of the polymer. This may be accomplished electrically, although preference is generally given to heating of the grid by means of gases or vapours having a boiling point which coincides with the desired grid temperature. The granular material, which term will here be used to include chips, shavings, etc., initially fuses at the upper side of the grid bars and flows as a mixture of highly viscous liquid and semi-fused granules between the bars where a further heating and fusing of the mass occurs. The melt is further homogenized, in the storage chamber below the grid bars, prior to being discharged by the spinning pumps.

A condition of equilibrium, dependent on temperature of the grid bars and on the take-off rate of the spinning pumps, sets in for the transition point or the region where the granules become melt. Small variations in the grid temperature or in the take-off of the pumps, or modifications in the pressure distribution in the granular mass above the grid, may give rise to fluctuations of the transition point for this region. In the case of the heretofore known methods, these fluctuations result in difficulties since the melt may then creep up against the grid wall at different and varying levels.

On the other hand, a falling melt level may result. In other words, fused polymer lags or stays behind on the grid wall and is not removed therefrom before the melt again reaches the same temperature level. This polymer retains granules which in this manner are kept at a high temperature for a long period. All of the foregoing may give rise to formation of a rim consisting of degraded or even carbonized polymer on the inner wall of the grid. Moreover, when some of this polymer is released from the rim, this may cause a clogging in the spinning plate, or a weak spot in the spun product.

The formation of the aforesaid rim from degraded polymer or other impurities is also promoted if the temperature of the grid wall is permitted to decrease in an upward direction. As a result, the granules descending along this wall gradually soften and finally remain stuck in a rim already or previously formed.

An object of the present invention is to provide a melt spinning system not having the disadvantages of those known systems enumerated above.

Another object of this invention is to provide an apparatus for melt spinning which obviates formation of deposits within the spinning system.

Still another object of the present invention is to provide a melt spinning system which may be operated for prolonged periods of time without maintenance due to formation of deposits therein.

A further object of this invention is to provide an apparatus for controlling the temperature of a melt spinning system throughout various stages of the operation in order to prevent buildup of deposits from degraded polymer or other impurities.

Other objects and advantages of this system will become apparent upon study of the following detailed disclosure.

The foregoing objects may be accomplished, in accordance with this invention if the known systems are modified so that the grid inner wall, up to less than 3 cm. above the upper side of the grid bars, is maintained at the same temperature as these grid bars, if thereafter the temperature is permitted to recede over a height of less than 1 mm., and if the temperature thereabove is maintained below the softening point of the polymer.

Surprisingly enough, it has been found that as a result of these measures no rim will form on the grid wall. Consequently, polymer granules can be melted and satisfactorily spun according to this system for very much longer periods of time than heretofore possible before the spinning process must be interrupted due to declining yarn quality.

The manner in which the upper portion of the grid wall is kept below the softening temperature of the polymer may be varied and accomplished in many different ways. A most favorable condition is obtained, however, if the grid inner wall, above the said receding or recessed portion, is kept at a temperature below 150° C., and preferably below 100° C., either by gas or a liquid cooling medium.

If the grid wall at the point of the receding temperature portion is kept very thin, it is possible to realize a considerable drop in temperature over a height of less than 1 mm. It is necessary, however, to provide extremely efficient cooling so that the heat consumption will not become high. It is also possible to construct the grid wall, at the point of the recess, as a membrane of great length and therefore of high heat resistance. However, this results in a flexible structure creating difficulties in practical use.

If a multiple grid having an inner wall consisting of two sections is used, these difficulties do not occur. The two sections should be aligned and separated by an annular gap having a width of less than 0.5 mm., with the gap being located at a height of 5 to 10 mm., preferably 8 mm., above the upper side of the grid bars.

U.S. Patent No. 2,300,083, dated October 27, 1942, suggests supplying granular material along a non-heated wall to a melting grid. The efforts discussed therein, however, did not lead to the desired result either because the measures described above were not applied, or only partially applied.

The methods proposed herein lead to particularly better results if the polymer is supplied to the melting grid under increased mechanical pressure. Increased pressure brings about a higher melt production per melt unit, although the risk that a particle of dirt from the rim of the melt will clog the spinning orifice is thereby increased. Moreover, an incrustation of dirt at the rim may become detached more quickly due to increased mechanical pressure. Prevention of a dirt rim formation on the inner grid wall, in accordance with the present invention, emphasizes the advantages of and permits use of this increased pressure without the accompanying disadvantages.

In addition to the method described, this invention also relates to an apparatus comprising a container for granules, a down pipe connected to the container, a melting grid consisting of one or more heatable grid bars and a heatable grid wall, a storage chamber, one or more spinning pumps, molding or spinning orifices, and a spinning cell, as well as a collecting device. These elements should be functionally arranged one after the other in the sequence stated, with the grid inner wall adjoining the inner wall of the down pipe and forming a continuous surface.

A much preferred embodiment of this invention is obtained if the grid inner wall, at a height of less than 3 cm. above the upper side of the grid bars, recedes or is recessed for a distance of less than 1 mm. and if the wall portion below said receding portion adjoins a heating system provided for the grid bars and the remaining wall portion is connected to a cooling system. The cooling system of this preferred apparatus comprises an annular conduit extending around the grid wall and having connections for the supply and discharge of a cooling medium. The medium may be any liquid, although it is preferred to use water or gases. According to another embodiment, which in a structural sense is somewhat more difficult to construct, but on the other hand presents an additional advantage in that no connections to a cooling medium circuit are required, consists in a cooling system having a series of axially directed cooling ribs arranged around the melting grid. This embodiment is illustrated and will be described fully hereinbelow.

The shape of the portion of the grid inner wall where the temperature recedes (the receding or recessed portion) is important for satisfactory functioning of the apparatus. At that point the wall should be so constructed that with the simplest possible auxiliary means, and with the least possible loss of energy, the large temperature drop over the height of the recess may be realized. It has already been stated that a very thin construction of the wall, or construction as an elongated membrane presents difficulties. These difficulties are obviated herein by forming the grid of multiple construction, or with the inner wall thereof consisting of two portions in registry one with another and separated by an annular gap having a width of less than 0.5 mm., said gap being located from 5 to 10 mm. (preferably 8 mm.) above the upper side of the grid bars. In this way the gas present in the gap forms an insulation between the cold and hot portions of the grid inner wall.

It is true that a transport of heat may still occur between the cold and hot portions as a result of radiation and/or heat conduction by the gas medium. This heat transport, however, is very small relative to the metallic heat transmission of the grid inner wall per se. Further, it has been found that a particularly effective heat insulation is obtained if the annular gap connects at the outside to an annular chamber one of the walls of which is so constructed that the cooled portion of the grid inner wall extends as a tapering lip towards the gap. The annular chamber appears to check considerably the heat conduction by the gaseous medium, but as a consequence thereof the length of the metallic connection between the cold and hot portion of the grid inner wall is extended. This causes a higher thermal resistance between these two portions.

It has now been found that in the case of large fluctuations in grid temperature, which may occur for example, during heating or cooling of the grid, the annular chamber may, as it were, breathe. Breathing, as used herein, is intended to mean production of a stream of gas through the gap from or towards the chamber due to an expansion or contraction of the generally inert gas therein.

If breathing is not prevented, polymer melt may be drawn into the annular chamber, along with the incoming gas, where it eventually will become degraded or carbonized. In the case of a gas stream moving toward the outside of the chamber, the impurities thus formed may then be forced into the melt where they will disturb the spinning process.

According to this invention, it has now been found that the foregoing will not occur if the annular chamber is filled for the greater part by an annular element consisting of heat-insulating and heat-resistant material. Asbestos cement has been found to be very suitable for this purpose.

Finally, the invention herein relates to one of the apparatus described hereinabove in which, however, a member is provided in the down pipe thereof for exerting a pressure, in a manner known to this art, on the polymer mass in the direction of the melting grid. Such members are known per se and usually are applied in the form of endless screws, propeller blades, rams, and the like. As previously explained, difficulties with regard to the use of pressure-exerting members are removed by the combination of said members with the system described herein. In this way, the advantages obtained with the pressure elements are fully utilized without the disadvantages thereof.

Figure 2:
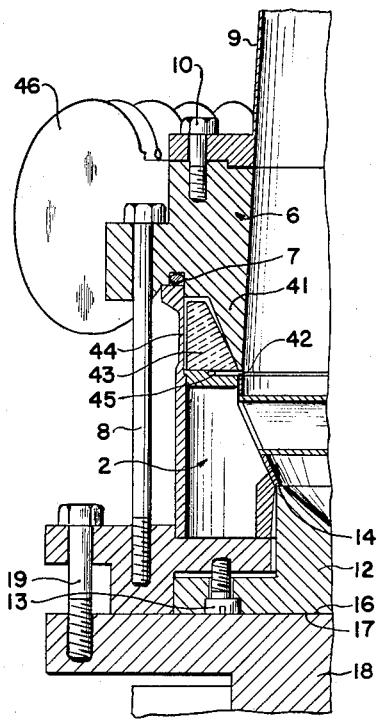
Figure 3:
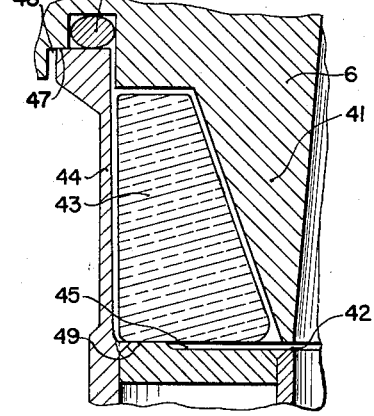

The invention will be further explained and illustrated below with reference to the accompanying drawings, wherein FIGURE 1 is directed to a cross-sectional view, in elevation, of a preferred embodiment of this invention;

FIGURE 2 shows a vertical section on an enlarged scale of a portion of the apparatus appearing in FIGURE 1; and FIGURE 3 is drawn to a detail of FIGURE 2 on a still more enlarged scale.

In FIGURE 1, reference numeral 1 denotes a melting grid having an annular mantle 2 which is provided at two opposite sides with fluid conduits 3 and 4. By means of these conduits, the melting grid is connected to a device (not shown) for the supply of a heating medium. Within the annular mantle 2 and connected thereto on both sides, there is provided a system of tubes 5 which constitute grid bars through which the heating medium flows. At the upper side thereof, annular mantle 2 borders on a cooling ring 6 and is sealed thereto through a silver ring 7. The cooling ring 6 and the mantle 2 are secured in sealed relationship by means of elongated bolts 8.

A down pipe 9 is secured on the melting grid 1 by means of bolts 10. Nipple 11 is fixed in the side wall of this down pipe and may be connected through a suitable conduit (not shown) to a source of nitrogen by means of which the oxygen is forced out of the down pipe and therefore out of the polymer present therein, all as is known in this art. Below the tubes or grid bars 5 and in the mantle 2 there is provided a collecting hopper 12. FIGURE 2 shows the manner in which this collecting hopper is fixed by means of bolts 13 against a seat 14 of the annular mantle 2. The hopper 12, which is constructed as a solid block, is provided with a discharge opening 15 so dimensioned that the melt of the polymer to be spun by this apparatus barely flows under the influence of its own weight, or by hydrostatic pressure. The collecting hopper has a flat bottom surface 16 with which it fits flush against the flat upper surface 17 of a pump block 18. In this way an excellent heat transfer between the hopper and the pump block is obtained.

The melting grid 1 and the pump block 18 are interconnected by means of bolts 19. These bolts also maintain the discharge opening 15 of collecting hopper 12 in registry with the entrance 20 of a suction line 21 through which molten polymer is supplied to spinning pump 22. Pressure line 23 leads from the pump to a sand filter 24 provided above a spinning plate 25. The pump block is surrounded by a heating jacket 26 through which shaft 27 of the spinning pump is passed.

To the upper edge 28 of the down pipe 9 there is secured a radially projecting flange 29. Between the flange 29 and a counter flange 30 the lower end of a rubber sleeve 31 is clamped. The upper edge of sleeve 31 is clamped between flanges 32 and 33, the latter of which is connected by means of bolts 34 to a flange 35 of a granule cock 36. This cock is adapted to close the discharge opening of a fixed granule bunker 37. In the closed position of cock 36 nitrogen gas may escape from the down pipe through a by-pass 38 to the granule bunker. In order to guide divided polymer from the granule bunker 37 through the cock 36 to the down pipe 9 there is connected to the flange 33 a coaxial length of tube 39 which extends into the down pipe 9. To facilitate replacement of the melting grid 1, the down pipe 9 connected therewith is provided with an annular handle 40. During the spinning process, which can be more clearly understood with reference to FIGURE 1, the spinning apparatus is mounted on top of a spinning box 50 of the usual type. Only the top of this box has been shown.

FIGURE 3 illustrates in particular the connection of annular mantle 2 to the cooling ring 6. Reference numeral 41 denotes the lower rim of the cooling ring which extends downwardly as a tapering lip. Between this lip 41 and the mantle 2 there remains a gap 42 located at a height of 8 mm. above the tubes 5 and having a gap width of 0.4 mm.

An annular filling element 43, made of pressed asbestos cement, fits into an annular chamber between the lip 41 and the mantle 2, behind the gap 42 as shown. The filling element borders at the outer side on the extended outer wall 44 of the mantle 2, which through silver ring 7 is connected in sealed relationship to the cooling ring 6. The cooling ring and mantle are drawn tightly together by bolts 8 so that the silver ring flows and the flanges 47, 48 contact each other.

The outer wall 44 is illustrated as being thin at the point of the filling element 43 in order to form a high thermal resistance. Rim 49 raises filling element 43 and provides a small open space 45 at the level of gap 42. This space 45 serves as a collector for impurities which might possibly pass through the gap 42. The ring 6 is cooled by thirty-two cooling ribs 46, shown more clearly in FIGURE 2, which ribs are equally spaced circumferentially therearound.

According to another possible embodiment, the cooling ring may be formed hollow with supply and discharge conduits through which coolants may be circulated. Water, for example, may be passed through the hollow ring. Both the air-cooled and the water-cooled embodiments of the cooling ring, however, provide means for cooling the lip 41 down to less than 100° C.

When using the apparatus for the melting and spinning of polyamide granules having dimensions of about 3 mm., it has been found possible to operate for approximately three months without interruption. After dismantling the apparatus and opening the grid it was found that dirt had not accumulated anywhere and that a rim of impurities had not been formed. In this connection, it is to be noted that the average operating time of the melting grids in he known embodiments amounts to two to three weeks, after which further spinning usually is impossible due to the formation of a rim of dirt or other material.

Inasmuch as other embodiments and alternatives will become apparent to those skilled in this art, it is intended that the scope of this invention be limited only to the extent set forth in he following claim.

What is claimed is:

A melting grid comprising:
(a) an annular mantle, said annular mantle having a vertical outer wall with a main body portion of one thickness and an upper portion of reduced thickness, a vertical inner wall extending coaxially with but terminating below the upper portion of said outer wall, upper and lower closure means extending radially outwardly from the terminal ends of said inner wall to connect the same with said outer wall and thereby form an annular heating zone without enclosing said upper portion of the outer wall, and tubular grid bars secured to the mid-portion of said inner wall and communicating with said annular heating zone;
(b) An annular cooling ring resting in coaxial relationship on the upper portion of said outer wall, said annular cooling ring having a lower lip projecting downwardly in overlapped relationship with the upper portion of said outer wall to define an annular chamber for separating the outer wall of said annular mantle from the annular cooling ring and terminating above the inner wall of said annular mantle to define an annular air gap for separating the cooling ring from the inner wall of said annular mantle, said cooling ring having an inner surface coextending with that of said inner wall, the inner wall of said annular mantle extending above the upper surface of said grid bars by less than 3 centimeters, and the annular gap defined by the lower lip of said annular cooling ring and the said inner wall being less than one millimeter in vertical height;
(c) a plurality of cooling ribs secured to and extending radially outwardly from the periphery of said annular cooling ring to lower the temperature of said lower lip;
(d) an annular rim projecting upwardly from the outer edge of said upper closure means to define an annular air space interconnecting said annular chamber with said annular air gap;
(e) insulating means supported by said annular rim and substantially filling said annular chamber; and
(f) means for raising the temperature in said annular heating zone and the grid bars communicating therewith.

References Cited in the file of this patent
UNITED STATES PATENTS

| | | |
|---|---|---|
| 2,253,089 | Nydegger | Aug. 19, 1941 |
| 2,300,083 | Worthington | Oct. 27, 1942 |
| 2,773,923 | Smith | Dec. 11, 1956 |

UNITED STATES PATENT OFFICE
CERTIFICATE OF CORRECTION

Patent No. 3,041,048　　　　　　　　　　　　　　　　June 26, 1962

James Watt Ijsbrand Heijnis

It is hereby certified that error appears in the above numbered patent requiring correction and that the said Letters Patent should read as corrected below.

In the grant, line 3, and in the heading to the printed specification, lines 4 and 5, for "a corporation of North Carolina", each occurrence, read -- a corporation of Delaware --.

Signed and sealed this 19th day of February 1963.

(SEAL)
Attest:

ESTON G. JOHNSON
Attesting Officer

DAVID L. LADD
Commissioner of Patents